(12) United States Patent
Yamase et al.

(10) Patent No.: US 10,731,572 B2
(45) Date of Patent: Aug. 4, 2020

(54) INTAKE CONTROL APPARATUS

(71) Applicant: KEIHIN CORPORATION, Shinjuku-ku, Tokyo (JP)

(72) Inventors: Masaki Yamase, Tochigi (JP); Daisuke Shiraida, Tochigi (JP)

(73) Assignee: Keihin Corporation, Tokyo (JP)

( * ) Notice: Subject to any disclaimer, the term of this patent is extended or adjusted under 35 U.S.C. 154(b) by 95 days.

(21) Appl. No.: 16/055,730

(22) Filed: Aug. 6, 2018

(65) Prior Publication Data

US 2019/0078518 A1  Mar. 14, 2019

(30) Foreign Application Priority Data

Sep. 8, 2017  (JP) ................. 2017-173473

(51) Int. Cl.
| | |
|---|---|
| *F02D 9/10* | (2006.01) |
| *F02D 9/02* | (2006.01) |
| *F02M 23/00* | (2006.01) |
| *F02M 35/10* | (2006.01) |
| *F02D 11/10* | (2006.01) |
| *F02D 31/00* | (2006.01) |
| *F02D 41/00* | (2006.01) |

(52) U.S. Cl.
CPC ............ *F02D 9/1055* (2013.01); *F02D 9/02* (2013.01); *F02D 41/0002* (2013.01); *F02M 23/003* (2013.01); *F02M 35/10308* (2013.01); *F02D 9/105* (2013.01); *F02D 31/005* (2013.01); *F02D 2009/0252* (2013.01); *F02D 2011/102* (2013.01)

(58) Field of Classification Search
CPC ... F02D 9/1055; F02D 9/1095; F02M 23/003; F02M 35/10308; F02M 35/10144
See application file for complete search history.

(56) References Cited

U.S. PATENT DOCUMENTS

| | | | | |
|---|---|---|---|---|
| 7,263,969 | B2* | 9/2007 | Sakamoto | F02M 23/001 123/336 |
| 9,334,809 | B2* | 5/2016 | Yamagishi | F02D 9/02 |
| 2002/0029759 | A1* | 3/2002 | Akagi | F02B 61/02 123/336 |
| 2006/0060175 | A1* | 3/2006 | Sonoda | F02D 9/1015 123/586 |
| 2007/0079803 | A1* | 4/2007 | Sakamoto | F02M 23/001 123/339.14 |

(Continued)

FOREIGN PATENT DOCUMENTS

| | | | | |
|---|---|---|---|---|
| EP | 2447512 A1 * | 5/2012 | ........... | F02D 9/1055 |
| JP | 2006-322423 A | 11/2006 | | |
| JP | 2014-047622 A | 3/2014 | | |

OTHER PUBLICATIONS

Office Action dated Sep. 11, 2018 issued in the corresponding Japanese patent application No. 2017-173473.

*Primary Examiner* — Sizo B Vilakazi
*Assistant Examiner* — Anthony L Bacon
(74) *Attorney, Agent, or Firm* — Carrier Blackman & Associates, P.C.; William D. Blackman; Joseph P. Carrier

(57) ABSTRACT

The intake control apparatus (1) includes a body (4) which integrally includes intake pipes (2a) and (2b). The body (4) includes a linear bypass passage (10a), which passes through thereinside, one end of which opens upstream of a valve body (5) of the intake pipe (2a), and the other end of which opens downstream of the valve body (5) of the intake pipe (2b).

6 Claims, 4 Drawing Sheets

(56) References Cited

U.S. PATENT DOCUMENTS

| | | | | |
|---|---|---|---|---|
| 2007/0101971 A1* | 5/2007 | Kondo | ............... | F02D 9/1055 123/336 |
| 2009/0301433 A1* | 12/2009 | Mitobe | ............... | F02D 9/1055 123/339.14 |
| 2013/0104831 A1* | 5/2013 | Cuniberti | ............ | F02M 35/112 123/184.21 |

* cited by examiner

INTAKE CONTROL APPARATUS

BACKGROUND OF THE INVENTION

Field of the Invention

The present invention relates to an intake control apparatus which controls intake air of an internal combustion engine.

Description of the Related Art

As the intake control apparatus which controls intake air of the internal combustion engine, conventionally there has been known an intake control apparatus which includes a plurality of intake pipes in which intake air to be introduced into the internal combustion engine passes; and a body (throttle body) which integrally includes these intake pipes (see Japanese Patent Laid-Open No. 2014-47622). A pair of adjacent intake pipes are connected to each other by a block-shaped connecting portion. A valve body for adjusting the intake air quantity is disposed in each of the intake pipes through a valve shaft supported by the body.

The connecting portion of the pair of intake pipes includes a space connected to an air cleaner, and an air bypass mechanism which supplies idle air for idling operation from this space. The air bypass mechanism includes a control valve which controls the quantity of intake air drawn from the space, and a bypass passage which supplies air passing through, to a downstream side of the valve body of each of the intake pipes.

This bypass passage is linear and thus can be easily formed by inserting a drill from a communication path disposed on an upstream side of the pair of intake pipes in the connecting portion and drilling a hole until the drill reaches a downstream side of the valve body of each of the intake pipes.

However, the intake control apparatus disclosed in Japanese Patent Laid-Open No. 2014-47622 is connected to the air cleaner to supply idle air for idling operation from the space arranged in the connecting portion of the body. For this reason, such an intake control apparatus which has the air cleaner connected only to the intake pipe of the throttle body cannot adopt a linear bypass passage such as in an intake control apparatus disclosed in Japanese Patent Laid-Open No. 2014-47622, which prevents the bypass passage from being easily formed by drilling.

SUMMARY OF THE INVENTION

In view of the above conventional technical problems, an object of the present invention is to provide an intake control apparatus allowing each bypass passage to be formed by drilling a hole by a drill at one position of a body even in an intake control apparatus where an air cleaner is connected only to an intake pipe of the body.

An intake control apparatus according to a first aspect of the invention is an intake control apparatus which controls an intake air quantity of an internal combustion engine, the intake control apparatus comprising:

a plurality of intake pipes in which intake air introduced into the internal combustion engine passes through;

a valve body which is disposed in each of the intake pipes and adjusts the intake air quantity of the intake pipes;

a connection portion which connects at least a pair of adjacent intake pipes of the plurality of intake pipes to each other; and a body which integrally includes the plurality of intake pipes and the connection portion, wherein the body includes a linear bypass passage which passes through inside of the connection portion, one end of which opens to an inner wall surface upstream of the valve body of one intake pipe of the pair of intake pipes and the other end of which opens to an inner wall surface downstream of the valve body of the other intake pipe.

According to the first aspect of the invention, the bypass passage is linear and communicates from an upstream side of one of a pair of intake pipes to a downstream side of the other intake pipe. Thus, the bypass passage can be easily formed simply by inserting a drill from an opening of the upstream side of the one intake pipe and drilling a hole at one position of the body.

In the first aspect of the invention, the intake control apparatus according to a second aspect of the invention comprises a linear branch passage, one end of which opens to an inner wall surface of the bypass passage and the other end of which opens to an inner wall surface downstream of the valve body of the one intake pipe.

According to the second aspect of the invention, the bypass passage and the branch passage can be formed by drilling a hole once respectively. The bypass passage and the branch passage function as a bypass passage of a pair of intake pipes. Therefore, the bypass passage related to the pair of intake pipes can be formed in an easy and compact manner.

In the second aspect of the invention, the intake control apparatus according to a third aspect of the invention is such that a cross-sectional area of a passage of the one intake pipe on a plane passing through a point spaced by an arbitrary distance to an upstream side in an extending direction of the one intake pipe from the valve body of the one intake pipe, the plane being orthogonal to the extending direction, is greater than a cross-sectional area of a passage of the other intake pipe on a plane passing through a point spaced by a same distance as the arbitrary distance to an upstream side in an extending direction of the other intake pipe from the valve body of the other intake pipe, the plane being orthogonal to the extending direction of the other intake pipe, on condition that the arbitrary distance is greater than a distance between an opening portion of the bypass passage of the one intake pipe and the valve body of the one intake pipe.

According to the third aspect of the invention, intake air which is drawn from the upstream side of the intake pipe is also drawn by the downstream side of the other intake pipe via the bypass passage. Accordingly, the cross-sectional area on the upstream side of the one intake pipe is greater than that of the other intake pipe, and thus the quantity of intake air supplied from the downstream side of each intake pipe can be balanced.

In the first aspect of the invention, the intake control apparatus according to a fourth aspect of the invention is such that the connection portion includes a plate-like connection base which extends in a direction from one of the pair of intake pipes to the other and in a direction where both of the intake pipes extend, and which connects both of the intake pipes, and the connection portion includes a projecting portion formed such that a part in a peripheral direction of a peripheral wall of the bypass passage projects in a thickness direction of the connection base.

According to the fourth aspect of the invention, the peripheral wall of the bypass passage can function as a reinforcing member for strengthening the connection base which connects the pair of intake pipes to each other.

DETAILED DESCRIPTION OF THE PREFERRED EMBODIMENTS

Hereinafter, embodiments of the present invention will be described using the drawings. An intake control apparatus according to a first embodiment controls an intake air quantity of an internal combustion engine.

Figure 1A:
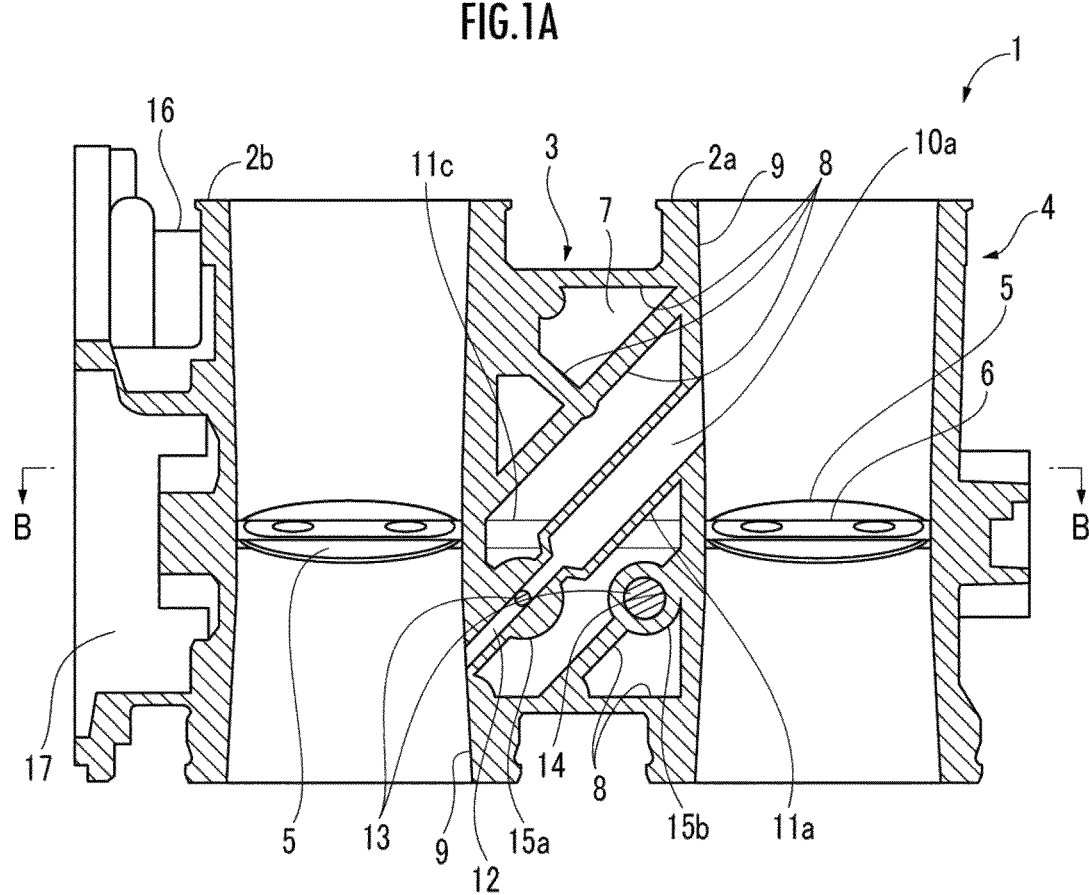
FIG. 1A is a cross-sectional view taken along a line A-A in FIG. 1B of an intake control apparatus according to a first embodiment of the present invention.
Figure 1B:
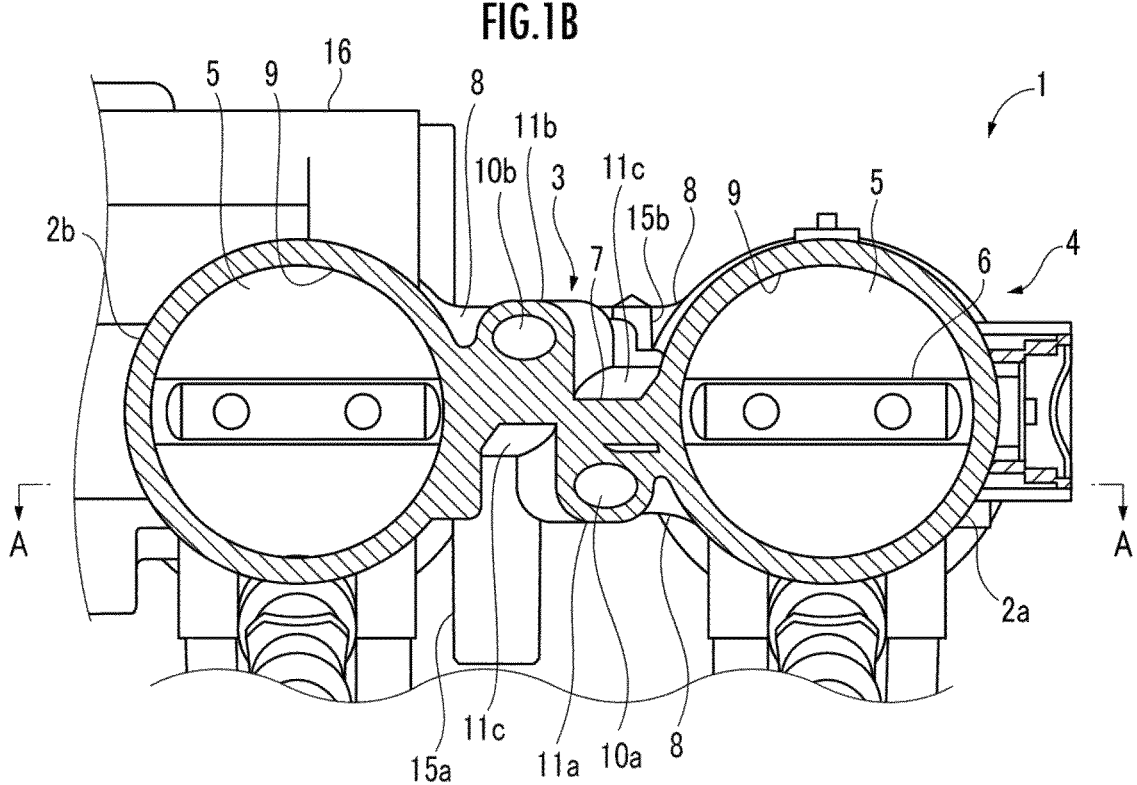
FIG. 1B is a cross-sectional view taken along a line B-B in FIG. 1A of the intake control apparatus.
Figure 2:
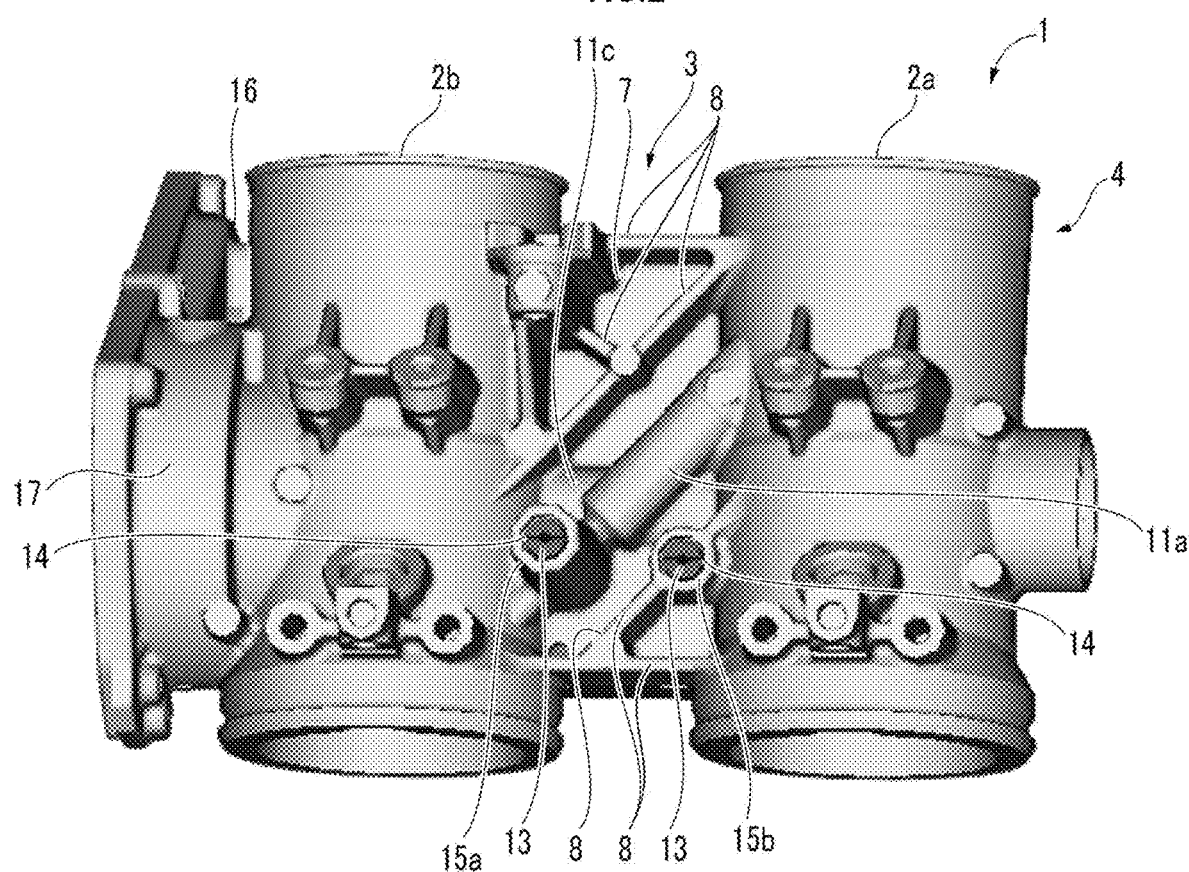
FIG. 2 is a perspective view illustrating an appearance of a body of the intake control apparatus in FIG. 1.

As illustrated in FIGS. 1A, 1B, and 2, an intake control apparatus 1 includes two intake pipes, a first intake pipe 2a and a second intake pipe 2b, through which intake air, to be introduced into the internal combustion engine, passes; a connection portion 3 which connects the first and second intake pipes 2a and 2b to each other. The intake pipes and the connection portion cooperate to form a body 4 (throttle body) which integrally includes the intake pipes 2a and 2b and the connection portion 3 by integral molding or the like.

The intake control apparatus 1 may include a control unit which controls the internal combustion engine, an accelerator opening degree sensor, and the like. Each of the intake pipes 2a and 2b includes a valve body 5 which adjusts an intake air quantity of the intake pipes 2a and 2b.

The intake pipes 2a and 2b are connected to an air cleaner on an upstream side thereof (on an upper side in FIG. 1A) and connected to a combustion chamber of the internal combustion engine on a downstream side thereof (on a lower side in FIG. 1A). A butterfly valve body is used herein as the valve body 5. Each valve body 5 of the intake pipes 2a and 2b is rotatably supported by the body 4 via a common valve shaft 6.

The connection portion 3 includes a plate-like connection base 7 which extends in a direction from the intake pipe 2a to the intake pipe 2b and in a direction where both the intake pipes 2a and 2b extend, and which connects both the intake pipes 2a and 2b to each other. The connection base 7 includes a rib 8 for reinforcement.

The body 4 includes a first linear bypass passage 10a, which passes through inside the connection portion 3, one end of which opens on an inner wall surface 9, upstream of the valve body 5 of the intake pipe 2a and the other end of which opens on an inner wall surface 9 downstream of the valve body 5 of the intake pipe 2b. The body 4 also includes a second linear bypass passage 10b, which passes through inside the connection portion 3, one end of which opens on an inner wall surface 9, upstream of the valve body 5 of the intake pipe 2b, and the other end of which opens on an inner wall surface 9 downstream of the valve body 5 of the intake pipe 2a.

The connection base 7 includes projecting portions 11a and 11b formed such that a part of the bypass passages 10a and 10b in a peripheral direction of the respective peripheral wall projects toward one side and the other side in a thickness direction of the connection base 7 respectively. The connection base 7 includes a valve shaft storage unit 11c where the valve shaft 6 passes through thereinside.

The first and second bypass passages 10a and 10b are located on opposite sides, in the thickness direction, of the connection base 7 of the valve shaft storage unit 11c. Thus, both sides of the connection portion 3 are reinforced with a good balance by the projecting portions 11a and 11b constituting the respective peripheral walls of the first and second bypass passages 10a and 10b.

The bypass passages 10a and 10b include a small diameter portion 12 whose diameter is smaller on a downstream side than that on an upstream side. Each small diameter portion 12 of the bypass passages 10a and 10b communicates with an insertion hole 14 for inserting an idle screw 13. The insertion holes 14 are disposed perpendicular to the connection base 7 so as to allow the idle screw 13 to be inserted from the front side toward FIG. 1A for operation.

FIG. 1A illustrates a cross-section of a front end portion of the idle screw 13 which projects into the small diameter portion 12 of the bypass passage 10a and a cross-section of a hole forming portion 15a where the insertion hole 14 is formed. FIG. 1A also illustrates a cross-section of a base end portion of the idle screw 13 for the bypass passage 10b and a cross-section of a hole forming portion 15b where the insertion hole 14 is formed.

The body 4 further includes a motor housing unit 16 which is located on a rear side of the intake pipe 2b (on the back side toward FIG. 1A) and which houses a motor for rotating the valve shaft 6. The body 4 further includes a mechanism storage unit 17 which is located on one end side of the valve shaft 6 (on the left side of FIG. 1A) and which houses a gear mechanism for transmitting the rotation of the motor to the valve shaft 6 and an opening degree sensor for detecting the opening degree of the valve body 5.

As illustrated in FIG. 1B, the hole forming portion 15a is disposed projecting toward the opposite side of the motor housing unit 16 such that the corresponding bypass passage 10a is located on the opposite side of the motor housing unit 16 with the connection base 7 therebetween.

The bypass passage 10a is formed by inserting a drill from an opening on an air cleaner side (on an upper side in FIG. 1A) of the intake pipe 2a; positioning the distal end of the drill to the inner wall of the intake pipe 2a; and drilling a hole along the projecting portion 11a until the drill passes through the inner wall of the intake pipe 2b. Likewise, the bypass passage 10b is formed by inserting a drill from an opening on an air cleaner side of the intake pipe 2b and drilling a hole along the projecting portion 11b.

The insertion hole 14 of the idle screw 13 in the bypass passage 10a is formed by drilling a hole by a drill for forming this from an end surface of the hole forming portion 15a of the body 4. Likewise, the insertion hole 14 of the idle screw 13 in the bypass passage 10b is formed by drilling a hole from an end surface of the hole forming portion 15b of the body 4.

In this configuration, the opening degree of the valve body 5 is adjusted by a control unit or the like so as to be a target position. This adjustment is made by driving a motor in the motor housing unit 16 while referring to the opening degree of the valve body 5 obtained by an opening degree sensor in the mechanism storage unit 17.

While the internal combustion engine is idling, the valve body 5 is substantially closed and intake air is supplied from an upstream side of the valve body 5 in the intake pipes 2a and 2b to each combustion chamber of the internal combustion engine through the bypass passages 10a and 10b. At this time, a quantity of bypass intake air adjusted in advance by the idle screw 13 of the bypass passages 10a and 10b passes through the bypass passages 10a and 10b.

According to the present embodiment, the bypass passages 10a and 10b are linear and obliquely communicate with a downstream side of the intake pipes 2b and 2a from an upstream side of the pair of intake pipes 2a and 2b respectively. Thus, the bypass passages 10a and 10b can be easily formed simply by inserting a drill from an opening of the upstream side of the intake pipes 2a and 2b and drilling a hole until the drill reaches the downstream side of the intake pipes 2b and 2a.

Figure 3A:
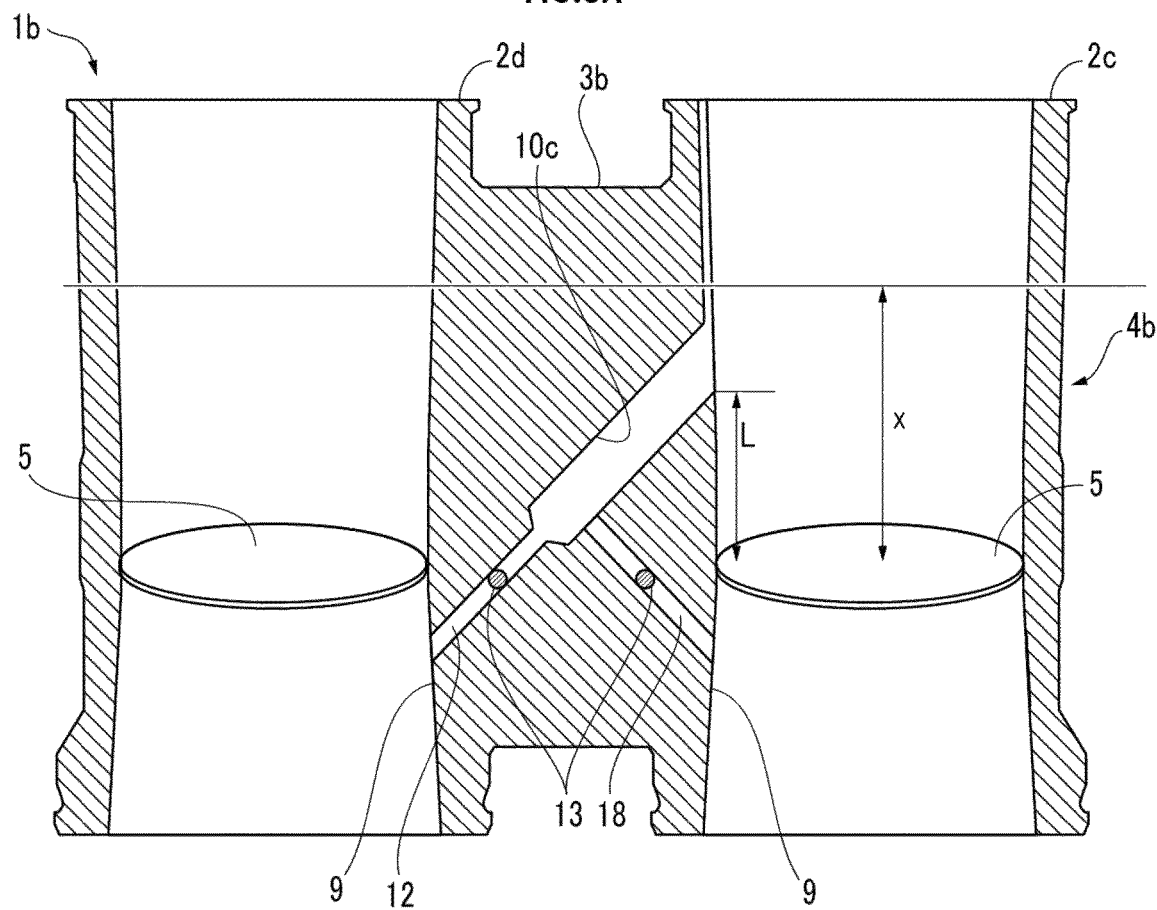
FIG. 3A is a schematic cross-sectional view illustrating a portion corresponding to FIG. 1A in an intake control apparatus according to a second embodiment of the present invention.
Figure 3B:
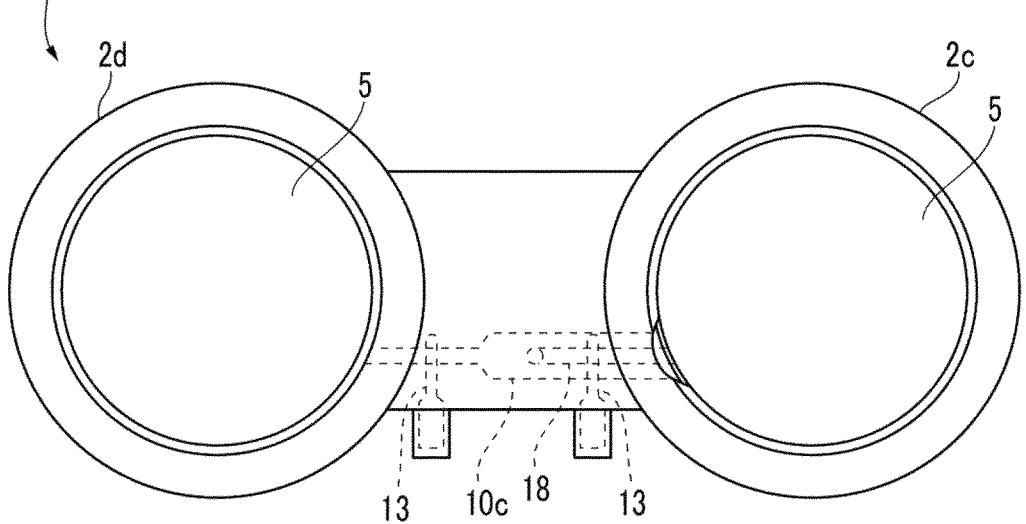
FIG. 3B is a schematic plan view of the intake control apparatus.

FIGS. 3A and 3B illustrate an intake control apparatus 1b according to a second embodiment of the present invention. Note that in order to simplify the features, only the main components are schematically illustrated in these figures, and thus the valve shaft and the like are omitted.

The intake control apparatus 1b according to the present embodiment includes two intake pipes 2c and 2d in which intake air to be introduced into the internal combustion engine passes; a valve body 5 which is disposed in each of the intake pipes 2c and 2d and which adjusts an intake air quantity of the intake pipes 2c and 2d; a connection portion 3b which connects the intake pipes 2c and 2d to each other; and a body 4b which integrally includes the intake pipes 2c and 2d and the connection portion 3b by integral molding or the like.

The body 4b includes a linear bypass passage 10c, which passes through inside the connection portion 3b, one end of which opens on an inner wall surface 9 upstream of the valve body 5 of the intake pipe 2c and the other end of which opens on an inner wall surface 9 downstream of the valve body 5 of the intake pipe 2d. The bypass passage 10c has the same configuration as that of the bypass passage 10a according to the first embodiment.

The body 4b further includes a linear branch passage 18, which passes through inside the connection portion 3b, one end of which opens on the inner wall surface 9 of the bypass passage 10c, and the other end of which opens on the inner wall surface 9 downstream of the valve body 5 of the intake pipe 2c. The diameter of the branch passage 18 is substantially the same as the diameter of a small diameter portion 12 of the bypass passage 10c.

The small diameter portion 12 and the branch passage 18 of the bypass passage 10c communicate with an insertion hole for inserting an idle screw 13 so that each distal end of the idle screw 13 projects into the small diameter portion 12 and the branch passage 18. The insertion holes are disposed so as to allow the idle screw 13 to be inserted from the front side toward FIG. 3A for operation.

The branch passage 18 is linear, and thus the branch passage 18 is formed by inserting a drill into the intake pipe 2c through an opening on the internal combustion engine side of the intake pipe 2c and drilling a hole from the inner wall of the intake pipe 2c to the bypass passage 10c.

S1 is defined as a cross-sectional area of a passage of the intake pipe 2c on a plane passing through a point spaced by an arbitrary distance x to an upstream side in an extending direction of the intake pipe 2c from the valve body 5 of the intake pipe 2c, the plane being orthogonal to the extending direction. S2 is defined as a cross-sectional area of a passage of the intake pipe 2d on a plane passing through a point spaced by the same distance as the distance x to an upstream side in an extending direction of the intake pipe 2d from the valve body 5 of the intake pipe 2d, the plane being orthogonal to the extending direction of the intake pipe 2d.

Note that the distance x is greater than a distance L between an opening portion of the bypass passage 10c of the intake pipe 2c and the valve body 5 of the intake pipe 2c. In this case, the cross-sectional area S1 of the passage of the intake pipe 2c is greater than the cross-sectional area S2 of the passage of the intake pipe 2d. The second embodiment has the same configuration as the first embodiment except for the above described points.

In this configuration, when the valve body 5 is completely closed, a quantity of intake air set by the idle screw 13 is supplied from upstream of the valve body 5 of the intake pipe 2c to each combustion chamber of the internal combustion engine through the bypass passage 10c and the branch passage 18.

Meanwhile, when the valve body 5 is opened, a quantity of intake air corresponding to the opening degree of the valve body 5 passes through the intake pipe 2c and the intake pipe 2d and further is supplied to the downstream side of the intake pipe 2c and the intake pipe 2d also from the opening portion on the side of the intake pipe 2c in the bypass passage 10c through the bypass passage 10c and the branch passage 18.

Therefore, if the quantity of intake air passing through the upstream side of the intake pipe 2c is not increased by the quantity of intake air supplied to the downstream side of the intake pipe 2d through the bypass passage 10c, the quantity of intake air supplied to the internal combustion engine from the downstream side of the intake pipe 2c is reduced more than the quantity of intake air supplied to the internal combustion engine from the downstream side of the intake pipe 2d. In other words, the balance of the quantity of intake air supplied to the internal combustion engine is lost between the intake pipe 2c and the intake pipe 2d.

In this respect, in the present embodiment, as described above, the cross-sectional area of the passage of the intake pipe 2c at a point separated by the above distance x is greater than the cross-sectional area of the passage of the intake pipe 2d at a point separated by the same distance as the distance x. For this reason, the balance of the quantity of intake air supplied to the internal combustion engine is maintained between the intake pipe 2c and the intake pipe 2d.

As described above, according to the intake control apparatus 1b of the present embodiment, the bypass passage 10c and the branch passage 18 are formed by drilling, and thereby the bypass passage related to the intake pipe 2c and the intake pipe 2d can be formed in an easy and compact manner. Further, as described above, the cross-sectional area on the upstream side of the intake pipe 2c is greater than that of the intake pipe 2d, and thus the quantity of intake air supplied to the internal combustion engine from the intake pipe 2c and the intake pipe 2d can be balanced.

Figure 4:
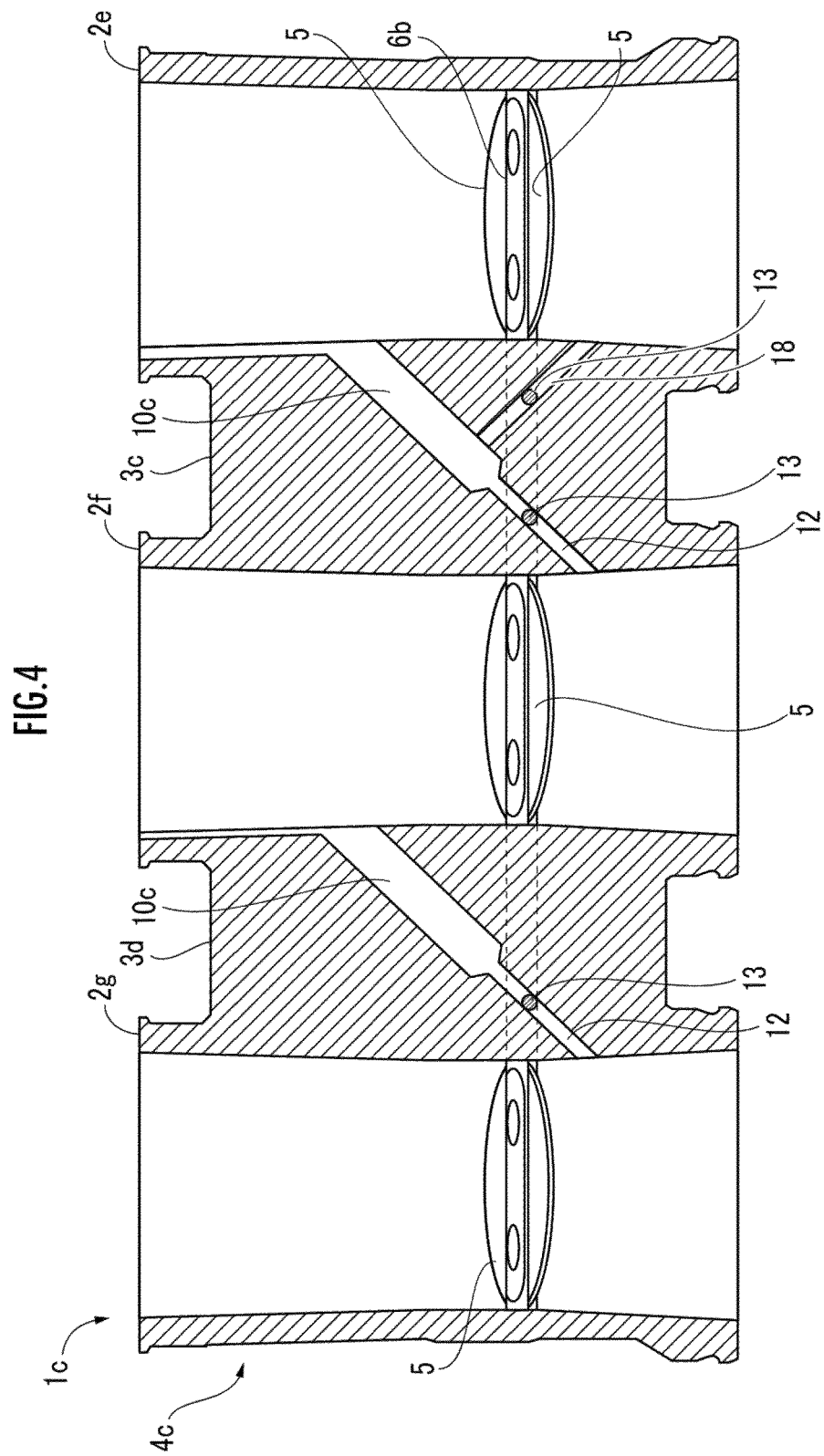
FIG. 4 is a schematic cross-sectional view of an intake control apparatus according to a third embodiment of the present invention.

FIG. 4 illustrates an intake control apparatus 1c according to a third embodiment of the present invention. Note that in order to simplify the features, FIG. 4 schematically illustrates only the main components, and thus the motor housing unit and the like are omitted.

The intake control apparatus 1c includes a body 4c which integrally includes three intake pipes 2e, 2f, and 2g in which intake air to be introduced into the internal combustion engine passes; a connection portion 3c which connects the intake pipes 2e and 2f; and a connection portion 3d which connects the intake pipes 2f and 2g. Each of the intake pipes 2e, 2f, and 2g includes a valve body 5 for adjusting the quantity of intake air passing through these pipes.

The valve bodies 5 of the intake pipes 2e, 2f, and 2g are supported by a common valve shaft 6b. The valve shaft 6b is rotatably supported by the body 4c. The opening degree of the valve body 5 is adjusted by a motor while referring to the opening degree detected by an opening degree sensor in the same manner as in the first embodiment.

The intake pipes 2e and 2f and the connection portion 3c have the same configuration and function as the intake pipes 2c and 2d and the connection portion 3b in the second embodiment. The intake pipes 2f and 2g and the connection portion 3d have the same configuration as the intake pipes 2c and 2d and the connection portion 3b in the second embodiment except that the branch passage 18 is missing.

The present embodiment has the same configuration and functional operation as those in the first embodiment and the second embodiment except the above described points. Note that in order to increase the cross-sectional area on the upstream side of the intake pipe 2f and the intake pipe 2e more than the cross-sectional area on the upstream side of the intake pipe 2g, the amount of increase in cross-sectional area of the intake pipe 2e is substantially twice the amount of increase in cross-sectional area of the intake pipe 2f. This maintains the balance of the quantity of intake air supplied to the internal combustion engine from each of the intake pipes 2e to 2g.

Hereinbefore, the embodiments of the present invention have been described, but only the present invention is not limited to this. For example, in the first embodiment, the linear bypass passages 10a and 10b are disposed between the intake pipes 2a and 2b, but one of the bypass passages 10a and 10b may be disposed therebetween. In this case, the quantity of intake air supplied from the intake pipes 2a and 2b during idling can be adjusted by changing the opening degree of the valve body 5 of the intake pipes 2a and 2b in addition to the idle screw or by fine-tuning the opening degree of the valve body 5 during idling by a motor.

What is claimed is:

1. An intake control apparatus for use as a component of an internal combustion engine, and which is configured to control an intake air quantity of intake air routed into the internal combustion engine when installed thereon, the intake control apparatus comprising:
   a plurality of intake pipes through which intake air for the internal combustion engine passes;
   a valve body which is disposed in each of the intake pipes and which is operable to adjust the intake air quantity of air passing through the intake pipes;
   a connection portion which connects at least a pair of adjacent intake pipes of the plurality of intake pipes to each other; and
   a throttle body which integrally includes the plurality of intake pipes and the connection portion,
   wherein the throttle body includes a first linear bypass passage which is disposed on a first side of the connection portion and passes inside of the connection portion, one end of the first linear bypass passage open to an inner wall surface, upstream of the valve body, of a first intake pipe of the pair of intake pipes, and the other end of which opens to an inner wall surface, downstream of the valve body, of a second intake pipe of the pair of intake pipes,
   and wherein the throttle body includes a second linear bypass passage which is disposed on a second side of the connection portion and passes inside of the connection portion, one end of the second linear bypass passage open to an inner wall surface, upstream of the valve body, of the second intake pipe, and the other end of the second linear bypass passage opens to an inner wall surface, downstream of the valve body, of the first intake pipe.

2. The intake control apparatus according to claim 1, further comprising
   a linear branch passage, one end of which opens to an inner wall surface of the bypass passage and the other end of which opens to an inner wall surface downstream of the valve body of the one intake pipe.

3. The intake control apparatus according to claim 1, wherein the connection portion has at least one reinforcing rib thereon.

4. The intake control apparatus according to claim 1, wherein each of the intake pipes has an inlet, an outlet, and a longitudinal axis, wherein the inlets of the intake pipes are situated adjacent to one another, and wherein the longitudinal axes of the intake pipes are oriented substantially parallel to one another.

5. An intake control apparatus for use as a component of an internal combustion engine, and which is configured to control a quantity of intake air routed into the internal combustion engine when installed thereon, the intake control apparatus comprising:
   a plurality of intake pipes through which intake air for the internal combustion engine passes;
   a valve body which is disposed in each of the intake pipes and adjusts the intake air quantity of the intake pipes;
   a connection portion which connects at least a pair of adjacent intake pipes of the plurality of intake pipes to each other; and
   a throttle body which integrally includes the plurality of intake pipes and the connection portion, wherein:
   the throttle body has a linear bypass passage formed therein which passes inside of the connection portion, one end of which opens to an inner wall surface upstream of the valve body of one intake pipe of the pair of intake pipes, and the other end of which opens to an inner wall surface downstream of the valve body of the other intake pipe,
   the throttle body further has a linear branch passage formed therein, one end of which opens to an inner wall surface of the bypass passage and the other end of which opens to an inner wall surface downstream of the valve body of the one intake pipe,
   and a cross-sectional area of a passage of the one intake pipe, on a plane passing through a point spaced by an arbitrary distance to an upstream side in an extending direction of the one intake pipe from the valve body of the one intake pipe, the plane being orthogonal to the extending direction, is greater than a cross-sectional area of a passage of the other intake pipe, on a plane passing through a point spaced by a same distance as the arbitrary distance to an upstream side in an extending direction of the other intake pipe from the valve body of the other intake pipe, the plane being orthogonal to the extending direction of the other intake pipe, on condition that the arbitrary distance is greater than a distance between an opening portion of the bypass passage of the one intake pipe and the valve body of the one intake pipe.

6. An intake control apparatus for use as a component of an internal combustion engine, and which is configured to control a quantity of intake air routed into the internal combustion engine when installed thereon, the intake control apparatus comprising:
- a plurality of intake pipes through which intake air for the internal combustion engine passes;
- a valve body which is disposed in each of the intake pipes and adjusts the intake air quantity of the intake pipes;
- a connection portion which connects at least a pair of adjacent intake pipes of the plurality of intake pipes to each other; and
- a throttle body which integrally includes the plurality of intake pipes and the connection portion, wherein:
- the throttle body has a linear bypass passage formed therein which passes inside of the connection portion, one end of which opens to an inner wall surface upstream of the valve body of one intake pipe of the pair of intake pipes, and the other end of which opens to an inner wall surface downstream of the valve body of the other intake pipe,
- the connection portion includes a plate-like connection base which extends in a direction from one of the pair of intake pipes to the other and in a direction where both of the intake pipes extend, and which connects the both intake pipes, and
- the connection portion includes a projecting portion formed such that a part in a peripheral direction of a peripheral wall of the bypass passage projects in a thickness direction of the connection base.

* * * * *